April 30, 1929.  K. E. LYMAN  1,711,119
BRAKE APPLYING MECHANISM
Filed June 7, 1927  3 Sheets-Sheet 2
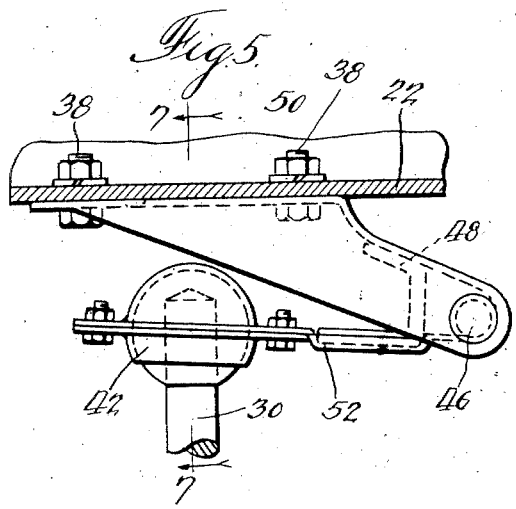
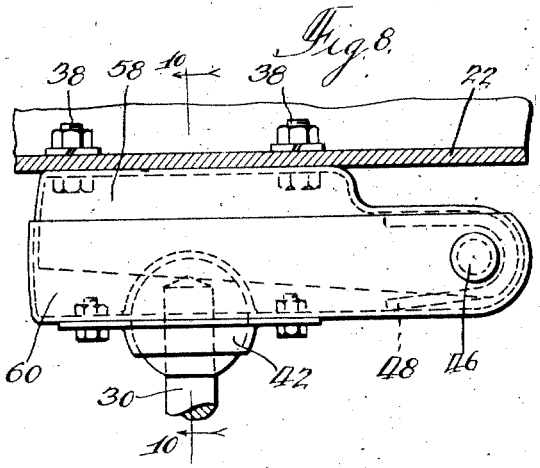
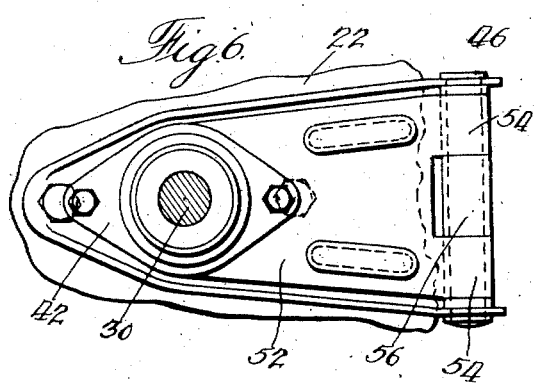
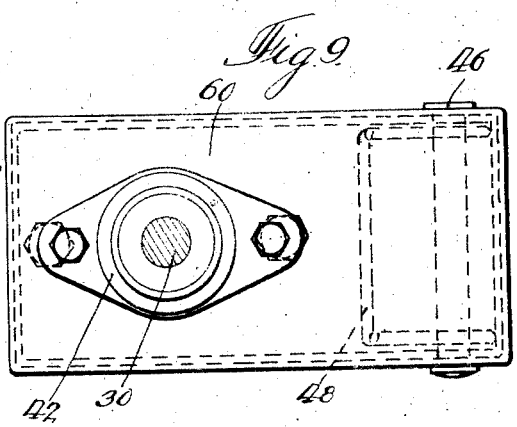
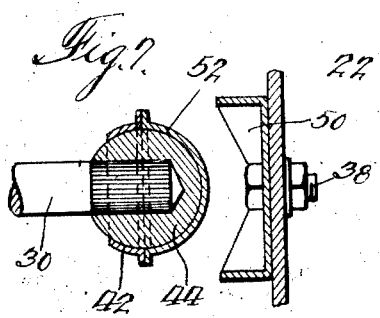
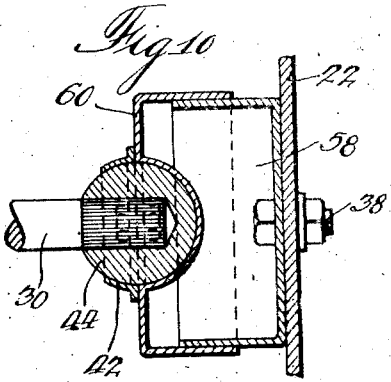
Inventor
KENNETH E. LYMAN

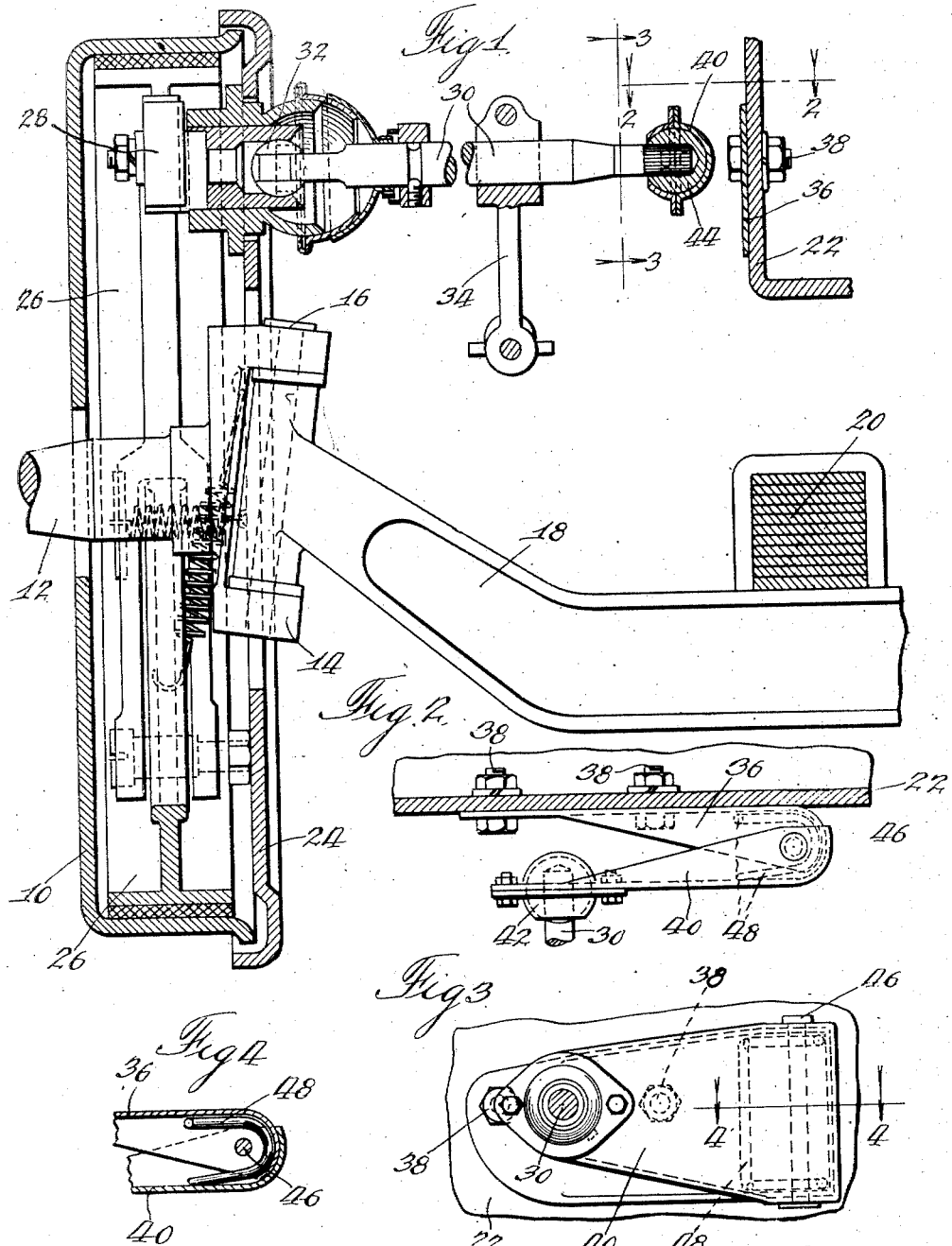

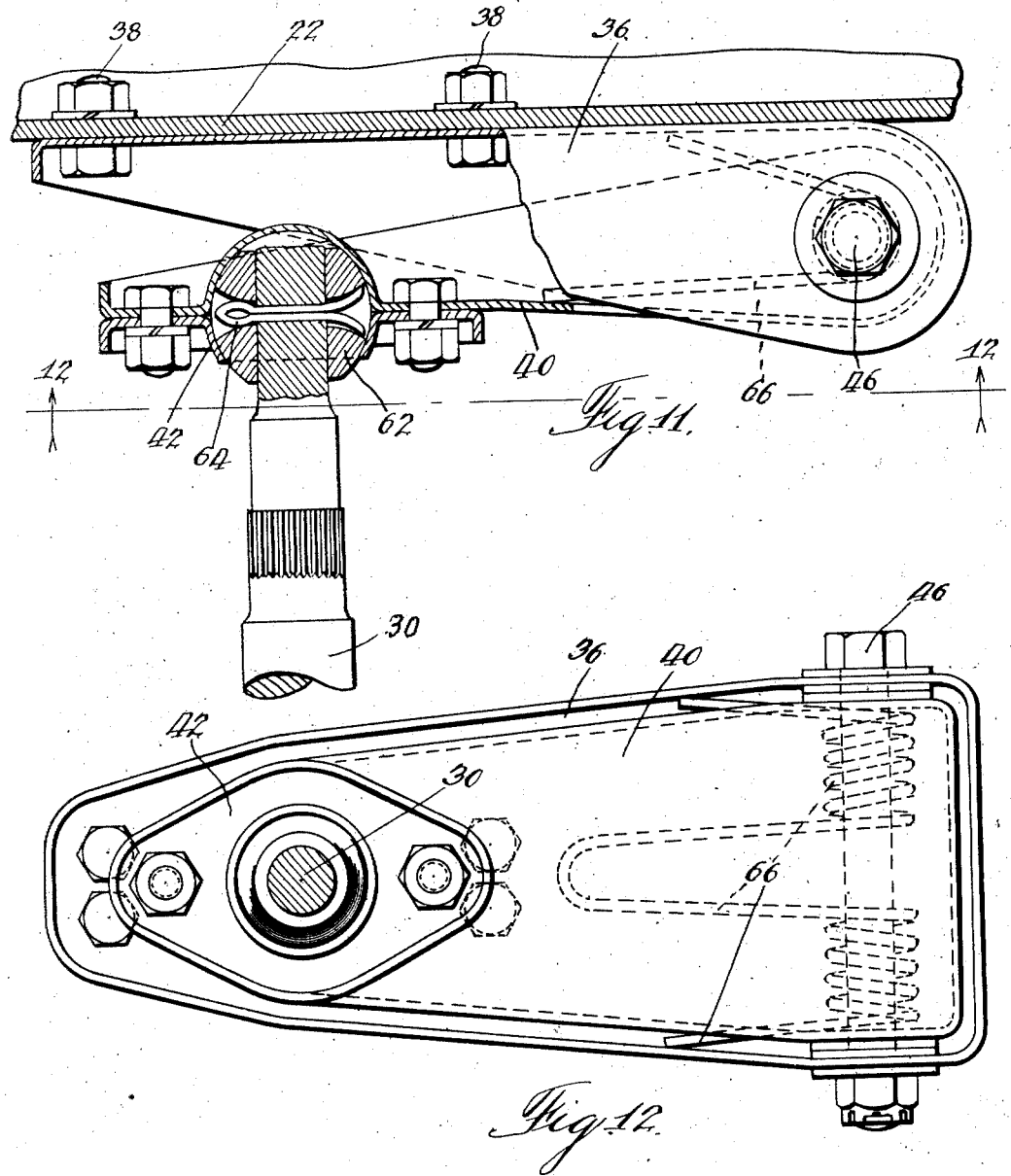

Patented Apr. 30, 1929.

1,711,119

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

BRAKE-APPLYING MECHANISM.

Application filed June 7, 1927. Serial No. 197,176.

This invention relates to brakes, and is illustrated as embodied in novel operating mechanism for a front wheel automobile brake. An object of the invention is to provide a strong but inexpensive support for the chassis end of the brake-operating shaft, preferably of a type capable of being made principally of steel stampings or pressings.

The drawings illustrate various forms of supports, each including a channel-section member secured to the chassis frame, and pivoted in a novel manner at one end to one end of a second channel-section member universally supporting the shaft at its other end. Preferably there is a spring between the two members urging them apart.

Another feature relates to supporting the shaft end by a novel ball-and-socket joint which does not require any lubrication, in that the metal socket incloses a shaft-supporting ball of phenolic condensation material such as bakelite.

The above and other objects and features of the invention will be apparent from the following description of the various illustrative embodiments shown in the accompanying drawing, in which:

Figure 1 is a vertical section through one front brake and associated parts, showing the brake-applying shaft in rear elevation;

Figure 2 is a partial section on the line 2—2 of Figure 1, showing the novel support in top plan;

Figure 3 is a section on the line 3—3 of Figure 1, showing the support in elevation;

Figure 4 is a partial section through the pivoted end of the support, on the line 4—4 of Figure 3;

Figures 5 and 6 are respectively views corresponding to Figures 2 and 3, and showing a modified form of support in top plan and in elevation;

Figure 7 is a section through the modified support, on the line 7—7 of Figure 5;

Figures 8, 9, and 10 are figures corresponding respectively with Figures 5, 6, and 7, but showing a different modified support; and Figures 11 and 12 are figures corresponding respectively to Figures 5 and 6, but showing still another form of support.

The brake illustrated in Figure 1 includes a drum 10 rotatably mounted, with a wheel (not shown) on the spindle 12 of a knuckle 14 which is swiveled, by a king-pin 16 or the like, at one end of an axle 18. Axle 18 supports, through the usual springs 20, the chassis frame 22.

A backing plate 24 may be secured to the knuckle 14 at the open side of drum 10. The friction means of the brake is shown as comprising shoes 26 operated by a cam 28 or the like. The cam, in turn, is operated by a shaft 30, through a universal joint 32 arranged above the king-pin 16. Shaft 30 is provided with a suitable arm or lever 34 for connection to the usual connections from the brake pedal.

According to the present invention, the chassis end of shaft 30 is universally supported, in a manner permitting the shaft a short movement lengthwise, by a novel support consisting principally of two pressed metal parts or steel stampings.

One stamping, shown at 36, is of channel section, the bottom being secured to frame 22 by bolts 38, and the side flanges being directed away from the frame. The other stamping shown at 40, is also of channel section, but with its side flanges directed toward the frame 22.

At its left end in Figure 2, stamping 40 is formed with a semispherical socket, cooperating with a separate part 42 suitably secured thereto, to receive a ball 44 pressed on the end of shaft 30. While a ball of bronze, especially graphite bronze, will be quite satisfactory for this purpose, in order to avoid entirely the necessity for lubrication I prefer to make the ball 44 of phenolic condensation material such as bakelite, this material having a very hard and glossy outer surface which has very low wear and friction factors when in engagement with steel or other metal.

At the right end of the support in Figure 2, the side flanges of member 36 fit between the side flanges of the member 40, the flanges being pivotally connected by a vertical pin 46. In order to relieve the pin 46 of the brake-applying force of lever 34, the two members 36 and 40 are formed at these ends with interengaging vertically-arranged cylindrical surfaces, thus member 40 transmits its end thrust directly to member 36, and not through pin 46.

Preferably a spring 48, confined between members 36 and 40, urges these members apart, and holds all of the parts of the brake control under spring tension.

In the arrangement of Figures 5–7, member or stamping 50, corresponding to member 36, is offset at its end away from frame 22, so that the other member 52 (corresponding to member 40) may extend substantially parallel to the frame. Member 52 in this case has at its end two cylindrical bearing portions 54 sleeved on the pin 46, and if desired the member 50 may have a similar portion 56 sleeved on the pin between portions 54.

In Figures 8-10, members or stampings 58 and 60, corresponding respectively to members 36 and 40, jointly form a close-fitting box or housing which prevents accumulation of mud, etc., between the two members.

In Figures 11 and 12, the ball 62, corresponding to ball 44, is secured to shaft 30 by a cotter pin 64, and spring 66, corresponding to spring 48, has coil portions surrounding the pivot pin 46.

While several illustrative embodiments have been described in detail, it is not my intention to limit the scope of the invention to those particular embodiments, or otherwise than by the terms of the appended claims.

I claim:

1. A support for the chassis end of a brake-applying shaft, comprising, in combination, a channel-section pressed-metal member having its bottom arranged to engage and be secured to a chassis frame member and having its side flanges directed away from the chassis frame member, a second channel-section pressed-metal member universally supporting the shaft end at one of its ends and having its other end nested with the end of the first channel-section member, the side flanges of the two members at said end fitting one within the other, and a pivot passing through the side flanges of both members at said end and pivotally connecting them.

2. A support for the chassis end of a brake-applying shaft, comprising, in combination, a channel-section pressed-metal member having its bottom arranged to engage and be secured to a chassis frame member and having its side flanges directed away from the chassis frame member, a second channel-section pressed-metal member universally supporting the shaft end at one of its ends and having its other end nested with the end of the first channel-section member, the side flanges of the two members at said end fitting one within the other, a pivot passing through the side flanges of both members at said end and pivotally connecting them, and a spring arranged between said members and urging them apart.

In testimony whereof, I have hereunto signed my name.

KENNETH E. LYMAN.